US007337807B2

(12) United States Patent
Koo et al.

(10) Patent No.: US 7,337,807 B2
(45) Date of Patent: Mar. 4, 2008

(54) HYDRAULIC CONTROL VALVE WITH REGENERATION FUNCTION

(75) Inventors: Bon Seok Koo, Kyungsangnam-do (KR); Man Suk Jeon, Kyungsangnam-do (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 224 days.

(21) Appl. No.: 11/215,617

(22) Filed: Aug. 30, 2005

(65) Prior Publication Data

US 2006/0081299 A1 Apr. 20, 2006

(30) Foreign Application Priority Data

Oct. 14, 2004 (KR) ..................... 10-2004-0082273

(51) Int. Cl.
*F16K 11/07* (2006.01)

(52) U.S. Cl. ............................ 137/625.69; 137/625.66

(58) Field of Classification Search ........... 137/625.69, 137/625.66, 596.2, 596.13, 596.18; 91/436
See application file for complete search history.

(56) References Cited

U.S. PATENT DOCUMENTS 4,397,221 A * 8/1983 Friesen et al. ................ 91/420
4,642,019 A * 2/1987 Sutton ................... 414/525.51
4,723,476 A * 2/1988 Stucky ......................... 91/436
5,615,705 A * 4/1997 Cho ........................ 137/596.2
5,791,226 A * 8/1998 Chung et al. .................. 91/29
5,813,310 A * 9/1998 Hori et al. ..................... 91/446
5,862,831 A * 1/1999 Chung et al. ............ 137/596.2
7,131,368 B2 * 11/2006 Jeon ............................ 91/436

* cited by examiner

*Primary Examiner*—John Rivell
*Assistant Examiner*—Craig Schneider
(74) *Attorney, Agent, or Firm*—Ladas & Parry LLP

(57) ABSTRACT

The present invention A hydraulic control valve with a regeneration function, including a main body formed of a supply fluid passage to which pressurized fluid is supplied, at least one port, a tank fluid passage for discharging the pressurized fluid to an outside storage tank, and a first regeneration fluid passage; a spool movably installed inside the main body for controlling the flow of the pressurize fluid, and including a second generation fluid passage formed therein; and a regeneration valve for returning only part of the pressurized fluid of the first regeneration fluid passage to the tank fluid passage to maintain pressure of the first regeneration fluid passage at a designated value, and for supplying the pressurized fluid to the second regeneration fluid passage, and if the pressure of the supply fluid passage is higher than a predetermined pressure, changing the pressure of the first regeneration fluid passage in accordance with a change of the pressure of the supply fluid passage.

3 Claims, 8 Drawing Sheets

HYDRAULIC CONTROL VALVE WITH REGENERATION FUNCTION

BACKGROUND OF THE INVENTION

1. Field of the Invention

The present invention relates in general to a hydraulic control valve with a regeneration function for heavy construction equipment such as an excavator, more specifically, to a hydraulic control valve capable of maintaining the pressure in a regeneration fluid passage, irrespective of changes in the discharge flow rate of a hydraulic pump, the location of working equipment, the regeneration flow rate and the return flow rate.

2. Description of the Related Art

Traditionally, a hydraulic control valve for use in heavy construction equipment, e.g., an excavator, had two functions: firstly, it controls the flow of pressurized fluid discharged from a hydraulic pump and supplies it to an actuator, e.g., a hydraulic cylinder; and secondly, it sends pressurized fluid returning during the operation of the hydraulic cylinder to a tank. With technical advances, a hydraulic control valve of recent years now has a regeneration function, whereby part of the pressurized fluid returning to the tank is supplied back to the hydraulic cylinder.

As aforementioned, the hydraulic control valve with a regeneration function sends the return pressurized fluid en route to the tank back to the hydraulic cylinder. In result, the work speed and the energy efficiency can be increased. Besides, it is possible to prevent the so-called cavitation phenomenon generated by insufficiency of a flow rate supplied to the chamber of hydraulic cylinder due to the transport speed of the hydraulic cylinder increased by the self-weight of the working equipment. Cavitation usually occurs at insufficiency of a flow rate into the chamber of the hydraulic cylinder and causes each component's life to be shorten. When actions for cavitation preventing are taken, the components' life can thus be extended.

FIG. 1 is a cross-sectional view of a related art hydraulic control valve with a regeneration function; FIG. 2 is a partial exploded view of a regeneration valve in FIG. 1; and FIG. 3 is a schematic view illustrating an example of the operation of a working equipment. The following will now describe the operation of a hydraulic control valve 3.

A pressurized fluid discharged from a hydraulic pump 1 is supplied to the hydraulic control valve 3 through a feed line (or supply line) 2. When a spool 7 inside the hydraulic control valve 3 switches to the left or right side, the pressurized fluid of the hydraulic pump 1 is supplied to a first port 4 or a second port 5 via a supply fluid passage 6.

The first port 4 is connected to a large chamber 8*a* of a hydraulic cylinder 8, and the second port 5 is connected to a small chamber 8*b* thereof. Hence, if the spool 7 switches to the right side, pressurized fluid is supplied to the large chamber 8*a* through the first port 4, and the hydraulic cylinder 8 is extended to the right side. Meanwhile, the pressurized fluid discharged from the small chamber 8*b* returns to a reservoir or a storage tank T by way of the second port 5 and a tank fluid passage 10*b*.

If the spool 7 switches to the left side, pressurized fluid is supplied to the small chamber 8*b* through the second port 5, and the hydraulic cylinder 8 is retracted to the left side. Meanwhile, the pressurized fluid discharged from the large chamber 8*a* returns to the tank T by way of the first port 4 and the tank fluid passage 10*a*.

When the spool 7 switches to the right side, as shown in FIG. 3, the hydraulic cylinder 8 is extended and an 'arm-in' is performed. Here, the pressurized fluid discharged from the small chamber 8*b* of the hydraulic cylinder 8 is supplied to the supply fluid passage 6 by the regeneration valve 12. Thus, by supplying part of this pressurized fluid en route to the tank back to the supply side (e.g., the hydraulic cylinder), it becomes possible to increase energy efficiency.

The pressurized fluid discharged from the small chamber 8*b* sequentially passes through the second port 5, first regeneration fluid passage 13, connection fluid passage 14, return fluid passage 16, and tank fluid passage 10*b*. Because the original area of the return fluid passage 16 is small, a pressure is created in the first regeneration fluid passage 13. If this pressure is higher than the pressure in a second generation fluid passage 15, a poppet 9 housed in the spool 7 moves to the right side, and the pressurized fluid of the first generation fluid passage 13 flows into the direction of the supply fluid passage 6 through the second regeneration fluid passage 15.

On the other hand, if a large force is required to operate the hydraulic cylinder 8, the pressure of the second port 5 should be lower than the pressure of the first port 4. That is, the lower the pressure of the first regeneration fluid passage 13, the larger the operational force for the hydraulic cylinder 8.

The regeneration spool 22 is elastically supported by a spring 23, and its front part comes in contact with a piston 21 which moves by the pressure from the supply fluid passage 6. Thus, if the pressure of the supply fluid passage 6 is higher than a designated value the piston 21 of the regeneration valve 12 is pressed by the pressure from the supply fluid passage 6, and the regeneration spool 22 moves to the right side. In result, the area of the return fluid passage 16 gradually increases and the pressure of the first regeneration fluid passage 13 is lowered accordingly, providing a larger force for the operation of the hydraulic cylinder 8.

The change of pressure in the first regeneration fluid passage 13, the flow rate passing through the first regeneration fluid passage 13 and the tank fluid passage 10*b*, and the area of the return fluid passage 16 satisfy the following equation:

$$\Delta P = C \times \left(\frac{Q}{A}\right)^2$$

ΔP: The change of pressure in the first regeneration fluid passage 13;

C: Flow coefficient;

Q: Flow rate from the first regeneration fluid passage 13 to the tank fluid passage 10*b*; and A: Variable area of the return fluid passage 16.

Here, the flow rate Q is related to several variables, e.g., the feed rate of the hydraulic pump 1, the location of a working equipment shown in FIG. 3 for example, and the flow regenerated through the second regeneration fluid passage 15.

The change of pressure of the first regeneration fluid passage 13 and the pressure in the supply fluid passage 6 react sensitively to the flow rate Q and the area A. The change of the pressures in the first and second ports 4, 5 make the motion of the hydraulic cylinder unnatural and awkward (this phenomenon is called hunting) as a result of poor hydraulic stability. Therefore, it becomes very difficult to control the motion of the hydraulic cylinder 8.

SUMMARY OF THE INVENTION

It is, therefore, an object of the present invention to provide a hydraulic control valve with a regeneration function, capable of maintaining the pressure in a regeneration fluid passage, irrespective of changes in the discharge flow rate of a hydraulic pump, the location of working equipment, the regeneration flow rate and the return flow rate.

To achieve the above object, there is provided a hydraulic control valve equipped with a regeneration valve, in which the regeneration valve regenerates the return fluid from the hydraulic cylinder and supplies it to a supply fluid passage, and maintains the pressure of a regeneration fluid passage at a constant level in accordance with the change of pressure of the supply fluid passage.

Accordingly, the present invention provides a hydraulic control valve with a regeneration function, including: a main body formed of a supply fluid passage to which pressurized fluid from outside is supplied, at least one port for supplying the pressurized fluid in the supply fluid passage to an actuator or receiving the return fluid from the actuator, a tank fluid passage for discharging the return fluid from the actuator to an outside storage tank, and a first regeneration fluid passage for supplying part of the return fluid from the actuator to the supply fluid passage; a spool movably installed inside the main body for controlling the flow of pressurized fluid by opening/closing the connections of the supply fluid passage, the port(s), the tank fluid passage, and the first regeneration fluid passage, respectively, and comprising a second generation fluid passage that supplies the pressurized fluid of the first regeneration fluid passage to the supply fluid passage; and a regeneration valve installed between the first regeneration fluid passage and the tank fluid passage for returning only part of the pressurized fluid of the first regeneration fluid passage to the tank fluid passage to maintain pressure of the first regeneration fluid passage at a designated value, and for supplying the pressurized fluid to the second regeneration fluid passage; and if the pressure of the supply fluid passage is higher than a predetermined pressure, changing the pressure of the first regeneration fluid passage in accordance with a change of the pressure of the supply fluid passage.

Preferably, the regeneration valve includes a sleeve installed between the first regeneration fluid passage and the tank fluid passage, and formed of a first fluid passage communicating with the first regeneration fluid passage and a second fluid passage communicating with the tank fluid passage; a main poppet movably installed inside the sleeve by being elastically supported by a first spring for changing an opening area of the second fluid passage, and comprising a back pressure chamber formed therein; a pilot poppet movably installed inside the sleeve by being elastically supported by a second spring, and if pressure of the back pressure chamber exceeds a predetermined pressure, discharging pressurized fluid of the back pressure chamber to the tank fluid passage; a pilot piston movably installed on a piston passage formed in front of the main poppet to be in contact with the front end portion of the pilot poppet; and a piston slidably installed on the front side of the sleeve for the rear end of the piston to be in contact with the front end portion of the pilot piston, and if the pressure of the supply fluid passage applied to the front end portion of the pilot piston exceeds the predetermined pressure set for the pilot poppet, moving the pilot piston and the pilot poppet backward.

More preferably, the hydraulic control valve of the present invention further includes a pressure regulator installed on the rear end of the regeneration valve for assisting the second spring to change the predetermined pressure set for the pilot poppet.

More preferably, the pressure regulator is operated by a signal pressure inputted from outside.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail. For example, pressure adjustment valve caps are shown at 140, 240 and 340 in FIGS. 5, 7 and 8, respectively.

Figure 1:
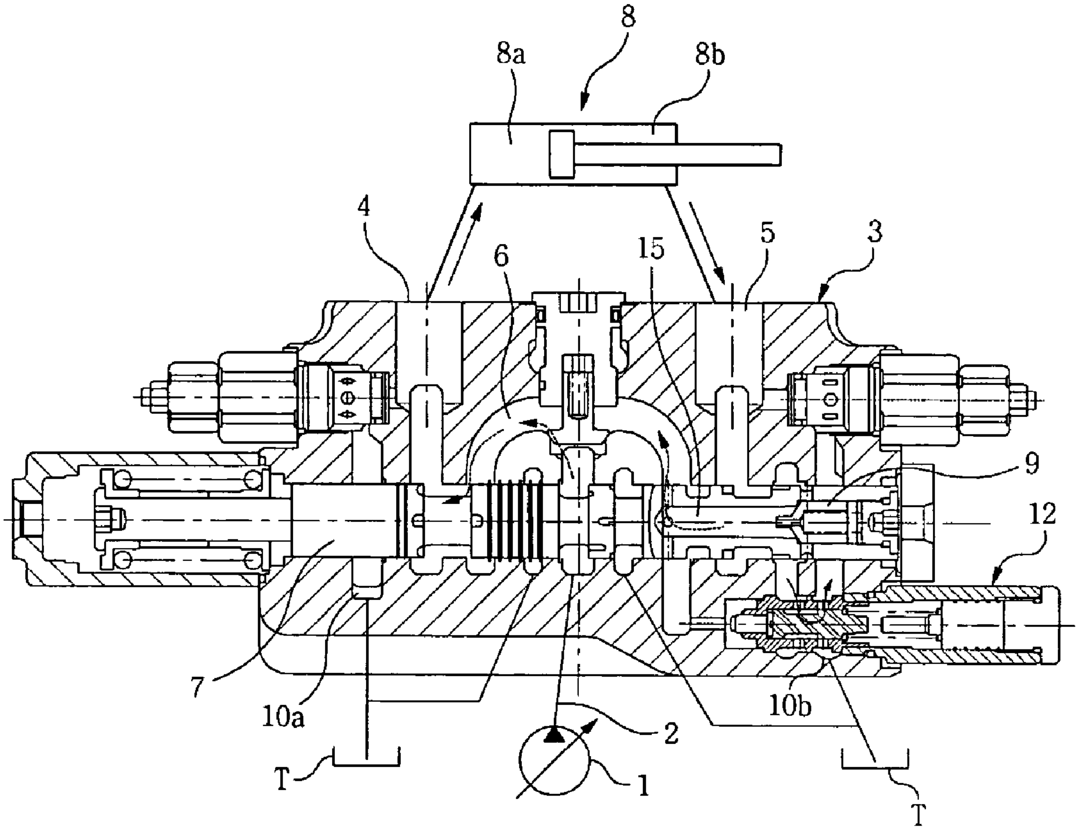
Fig.1 Prior Art
FIG. 1 is a cross-sectional view of a related art hydraulic control valve with a regeneration function in a partly sectional and partly schematic environment.
Figure 2:
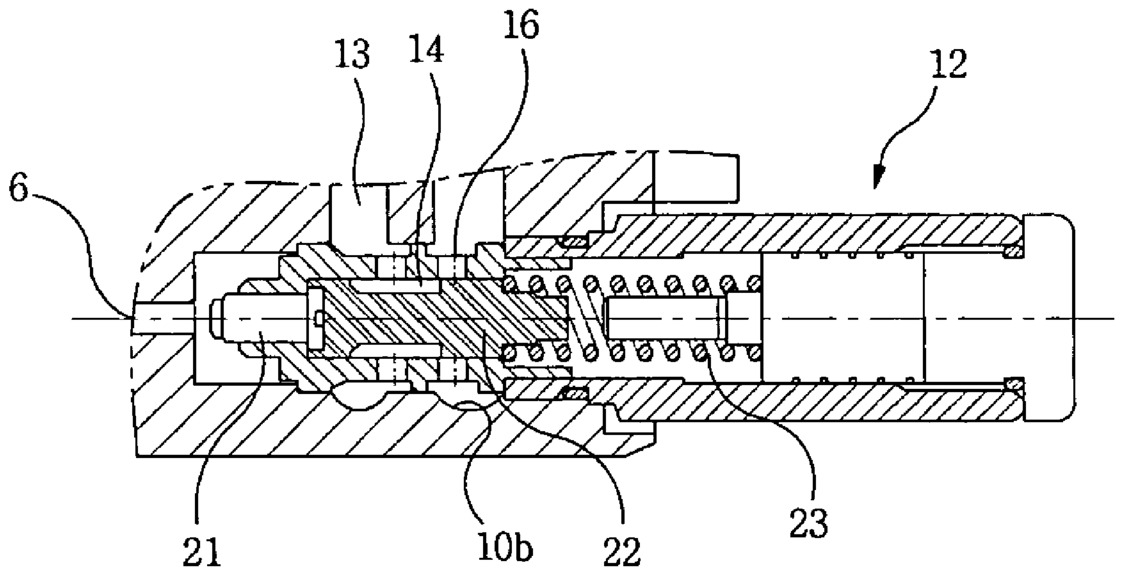
Fig.2 Prior Art
FIG. 2 is a partial exploded view of a regeneration valve in FIG. 1.
Figure 3:
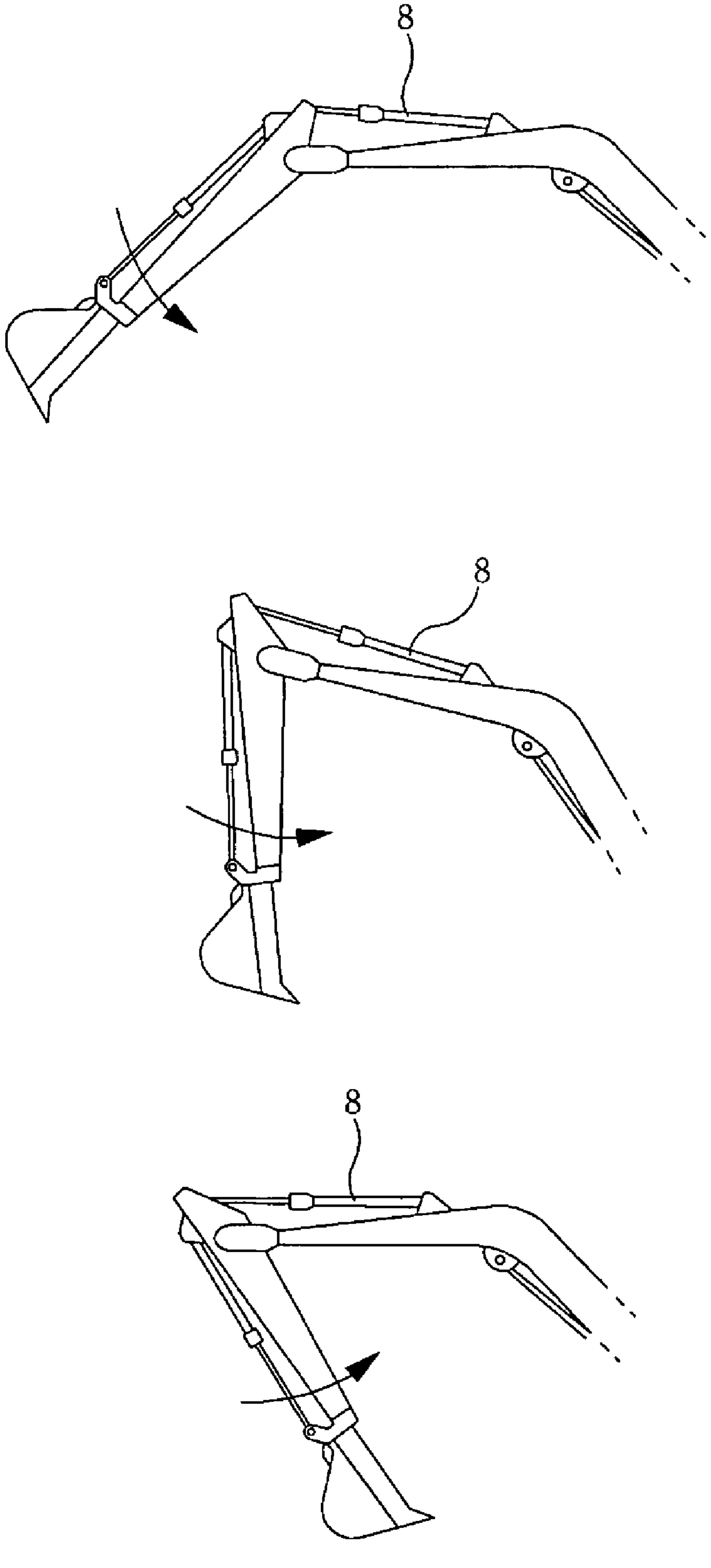
FIG. 3 is a schematic view illustrating an example of the operation of a working equipment
Figure 4:
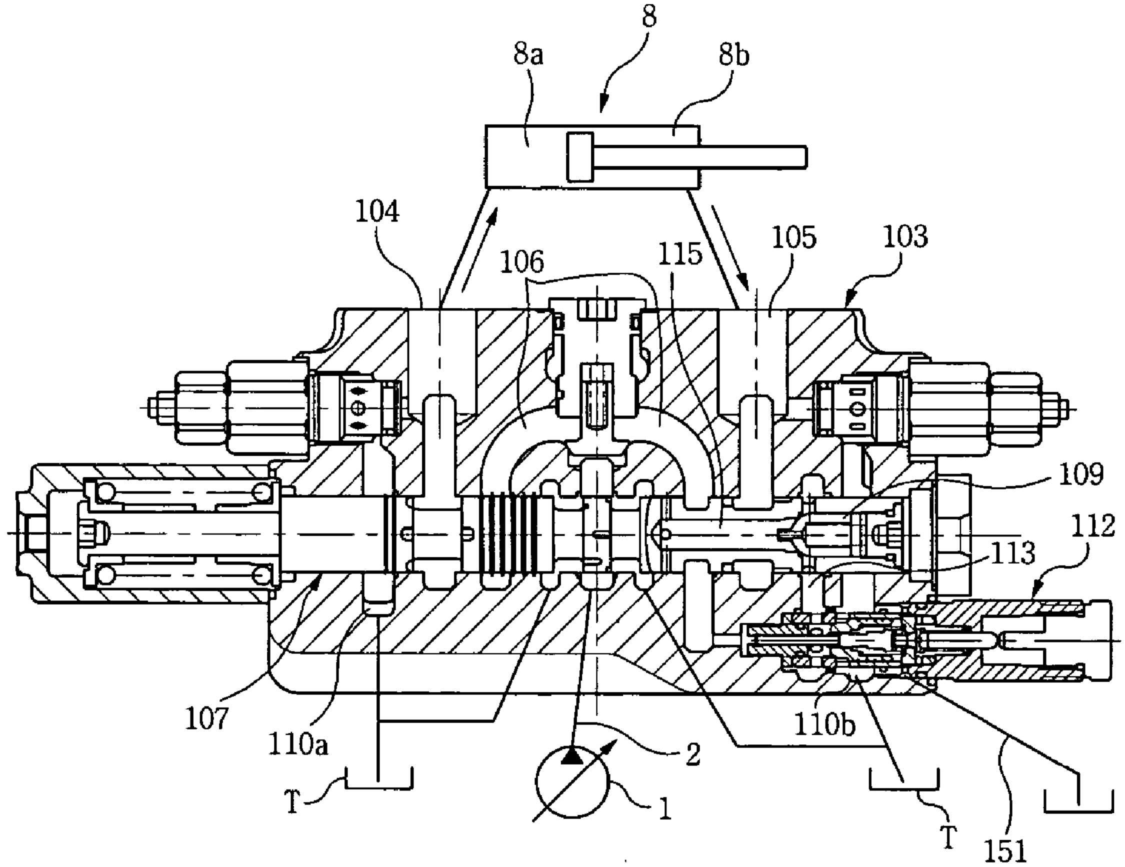
FIG. 4 is a cross-sectional view of a hydraulic control valve according to one embodiment of the present invention in a partly sectional and partly schematic environment.
Figure 5:
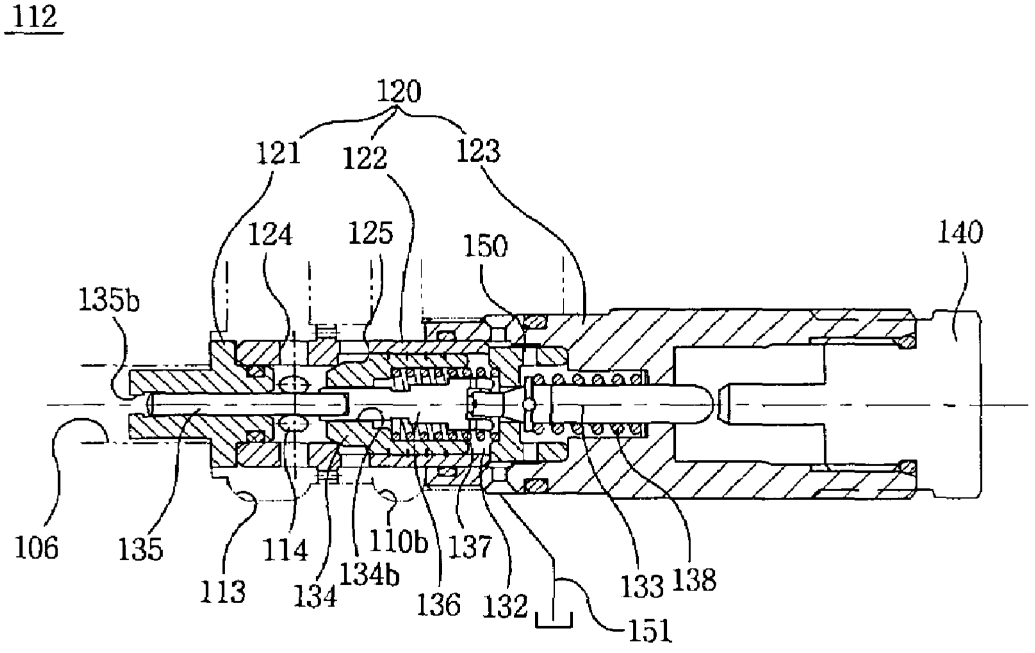
FIG. 5 is a partial exploded view of a regeneration valve in FIG. 4.

FIG. 4 is a cross-sectional view of a hydraulic control valve according to one embodiment of the present invention, and FIG. 5 is a partial exploded view of a regeneration valve in the hydraulic control valve of FIG. 4.

The hydraulic control valve with a regeneration function of the present invention supplies pressurized fluid to a hydraulic cylinder 8, one of actuators, and controls the operation thereof. The hydraulic control valve includes a main body 103 in which fluid passages for pressurized fluid are formed; a spool 107 slidably installed in the main body 103 for supplying pressurized fluid to the hydraulic cylinder 8; and a regeneration valve 112 for regenerating part of the pressurized fluid returning from the hydraulic cylinder 8.

Examples of the fluid passages formed in the main body 103 include a supply fluid passage 106 to which pressurized fluid discharged from a hydraulic pump 1 is supplied; a first port 104 and a second port 105 for supplying the pressurized fluid in the supply fluid passage 106 to the hydraulic cylinder 8, or receiving the return fluid from the hydraulic cylinder 8; and tank fluid passages 110*a*, 110*b* for discharging the return fluid from the hydraulic cylinder 8 to a storage tank T (e.g., reservoir). Further, the main body 103 includes a first regeneration fluid passage 113 for supplying pressurized fluid returning from the hydraulic cylinder 8 to the supply fluid passage 106, and regenerating the return fluid.

The spool 107 is slidably installed (e.g., in the lateral direction on the drawing) inside the main body 103. The spool 107 opens/closes the connections of the supply fluid passage 106, the first and second ports 104, 105, the tank fluid passage 110*a*,110*b*,and the first regeneration fluid passage 113, respectively, in order to control the flow of pressurized fluid. In addition, inside the spool 107 is a second regeneration fluid passage 115 that supplies the pressurized fluid of the first regeneration fluid passage 113 to the supply fluid passage 106. A poppet 109 is slidably installed in the longitudinal direction of the second regeneration fluid passage 115.

The regeneration valve 112 is installed between the first regeneration passage 113 and the tank fluid passage 110*b* so that only a part of pressurized fluid in the first regeneration passage 113 returns to the tank fluid passage 110*b*. As a result, the pressure of the regeneration passage 113 is maintained regularly, and the regeneration function of supplying the pressurized fluid to the second regeneration passage 115 is carried out.

The regeneration valve 112 includes a sleeve 120 installed between the first regeneration fluid passage 113 and the tank fluid passage 110*b* inside the main body 103; a main poppet 134 slidably installed in the sleeve 120; a pilot poppet 133 installed on the rear side of the main poppet 134; a pilot piston 136 slidably installed, passing through the main poppet 134; and a piston 135 slidably installed on the front side of the sleeve 120.

The sleeve 120 of the regeneration valve 112 is formed of three bodies, namely, a first body 121, a second body 122, and a third body 123, being sequentially connected. Inside the second body 122 is a first fluid passage 124 communicating with the first regeneration fluid passage 113, and a second fluid passage 125 communicating with the tank fluid passage 110*b*.

The main poppet 134, being elastically supported by a first spring 137, is slidably installed inside the sleeve 120. If the main poppet 134 translates laterally inside the sleeve 120, the opening area of the second fluid passage 125 changes. Moreover, the main poppet 134 has a back pressure chamber 132, that opens towards the back.

The pilot poppet 133, being elastically supported by a second spring 138, is slidably installed inside the sleeve 120.

The pressure from the supply fluid passage 106 moves the piston 135 to the right side, and because of this, the pilot piston 136 and the pilot poppet 133 in contact with the piston 135 move to the right side as well.

Therefore, as the pilot poppet 133 moves backward, pressurized fluid of the back pressure chamber 132 passes through a discharge fluid passage 150, and is discharged through a separate external drain 151, or (although not shown) if the discharge fluid passage 150 is communicated with the tank fluid passage 110*b* the pressurized fluid of the back pressure chamber 132 can be discharged to the storage tank T. In such case, the main poppet 134 also moves to the right side, and the pressurized fluid of the first regeneration fluid passage 113 travels to the connection fluid passage 114 and the second fluid passage 125, and eventually is discharged to the tank fluid passage 110*b*.

The rear end portion of the pilot piston 136 comes in contact with the front end portion of the pilot poppet 133, whereas the front end portion of the pilot piston 136 passes through a piston passage 134*b* formed in front of the main poppet 134, whereby the pilot piston 136 can slide with respect to the main poppet 134.

The rear end portion of the piston 135 comes in contact with the front end portion of the pilot piston 136, whereas the front end portion of the piston 135 is movably inserted into a front passage 135*b* of the first body 121 of sleeve 120. Thus, the pressure of the supply fluid passage 106 is applied to the front end portion of the piston 135. When the pressure of the supply fluid passage 106 exceeds a predetermined pressure for the pilot poppet 133, the piston 135 pressurizes the pilot piston 136 and the pilot poppet 133 backward.

The following will now explain the operation of the hydraulic control valve with a regeneration function.

Pressurized fluid discharged from the hydraulic pump 1 is supplied to the hydraulic control valve 103 through the supply fluid passage 2. As the spool 107 switches to the right or the left side, the pressurized fluid of the hydraulic pump 1 is supplied to the first port 104 or the second port 105 through the supply fluid passage 106.

If the spool 107 switches to the right side, the pressurized fluid is supplied to the large chamber 8*a* through the first port 104. In result, the hydraulic cylinder 8 is extended to the right side, and the pressurized fluid discharged from the small chamber 8*b* returns to the storage tank T via the second port 105 and the tank fluid passage 10*b*. Here, part of the return fluid is regenerated by the regeneration valve 112 and flows into the supply fluid passage 106.

If the pressure formed in the supply fluid passage 106 is higher than the pressure of the pilot poppet 133 predetermined by the second spring 138, the pilot poppet 133 will be shift to right so that the back pressure chamber 132 is opened to the tank passage portion 110*b*. This means to drop the pressure of regeneration passage 113. Therefore, the pressure of supply passage 106 can be used to move the cylinder 8, it is connected an attachment, with more power.

In another case, the regeneration process is performed when the pressure of the supply fluid passage 106 is lower than the predetermined pressure. For instance, the pressurized fluid discharged from the small chamber 8*b* of the hydraulic cylinder 8 is supplied to the first regeneration fluid passage 113 via the second port 105. Then, it sequentially passes through the first and second fluid passages 124, 125 of the regeneration valve 112, and returns to the storage tank T through the tank fluid passage 110*b*.

Because the second passage 125 is blocked at first by the main poppet 134, a pressure is created in the first regeneration fluid passage 113. If this pressure is higher than the pressure of the second regeneration fluid passage 115, the poppet 109 installed inside the spool 107 moves to the right side and thus, the pressurized fluid of the first regeneration fluid passage 113 flows into the supply fluid passage 106 through the second regeneration fluid passage 115.

In the course of the regeneration process, if an applied pressure to the back pressure chamber 132 is higher than the predetermined pressure set for the pilot poppet 133 by the second spring 138, the pilot poppet 133 moves to the right side. Accordingly, the pressure of the back pressure chamber 132 is lowered and at the same time, the pilot piston 136 moves to the left side and the main poppet 134 moves to the right side. In result, the pressurized pressure of the first regeneration fluid passage 113 is discharged to the storage tank 110*b*.

Thanks to the regeneration function, the pressure of the first regeneration fluid passage 113 is not much affected by the change of the flow rate, but maintains a constant level. Thus, hunting does not occur and the motion of the hydraulic cylinder 8 can be controlled gently.

When the hydraulic cylinder 8 is up to a large-load-requiring work, the regeneration valve 112 lowers the pressure of the first regeneration fluid passage 113. So that the pressure of supply passage 106 is used to move the cylinder 8, it is connected an attachment, with more power.

The pilot poppet 133 is elastically supported by the second spring 138, and this makes setting pressure predetermined. Meanwhile, the pressure of the supply fluid passage 106 is applied to the front end portion of the piston 135. If the pressure of the supply fluid passage 106 exceeds the predetermined pressure of the pilot poppet 133, the piston 135 pressurizes the pilot piston 136 and the pilot poppet 133 backward.

Therefore, when the pilot poppet 133 moves backward and thus the pressurized fluid of the back pressure chamber 132 is discharged to the tank fluid passage 110*b*, the pressure created in the first regeneration fluid passage 113 is reduced proportionally to an increase of pressure of the supply fluid passage 106. As a result, the change of pressure of the supply fluid passage 106 connected to the first regeneration fluid passage 113 becomes very small, and the motion of the hydraulic cylinder 8 is stabilized without being unnatural or awkward (i.e., hunting).

Figure 6:
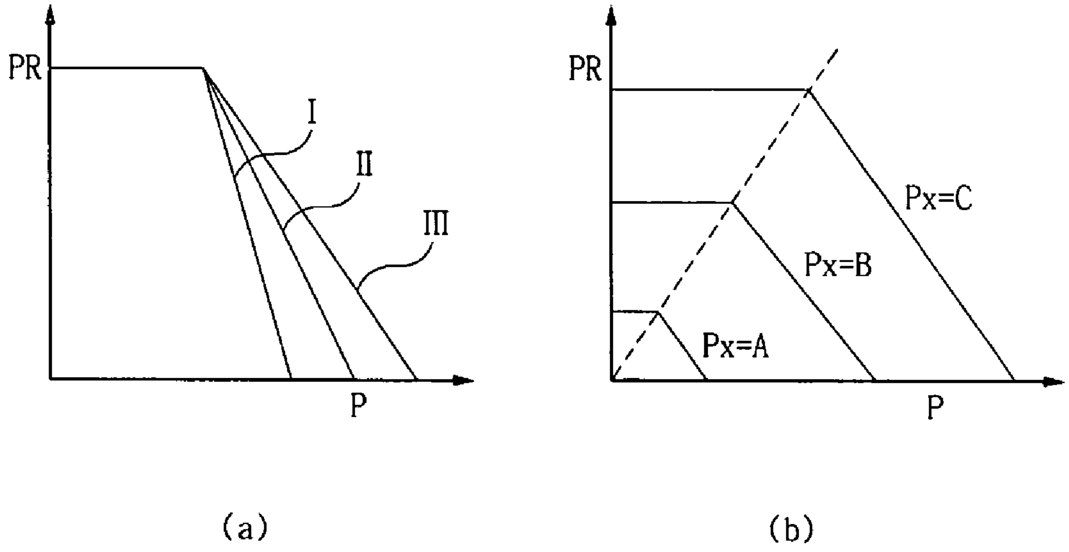
FIG. 6 graphically illustrates the change of pressure in the hydraulic control valve according to one embodiment of the present invention.

FIG. 6 graphically illustrates the change of pressure in the hydraulic control valve according to one embodiment of the present invention. In the drawing, PR denotes an applied pressure to the first regeneration fluid passage; Px denotes a signal pressure inputted from outside; P denotes an applied pressure of the supply fluid passage; and A, B and C denote arbitrary input values from outside (A<B<C).

As can be seen in FIG. 6(*a*), the ratio of the pressure of the supply fluid passage 106 to the pressure of the first regeneration fluid passage 113 can be controlled in dependence of the size correlation between the piston 135 and the pilot poppet 133.

Sometimes, there is need to combine the operation of one hydraulic-driven working equipment with another working equipment. In this case, the pressure on the supply side of the hydraulic pump is increased compulsorily to carry out a large work load. This can be realized by other embodiments of the present invention shown in FIG. 7 and FIG. 8, respectively.

Figure 7:
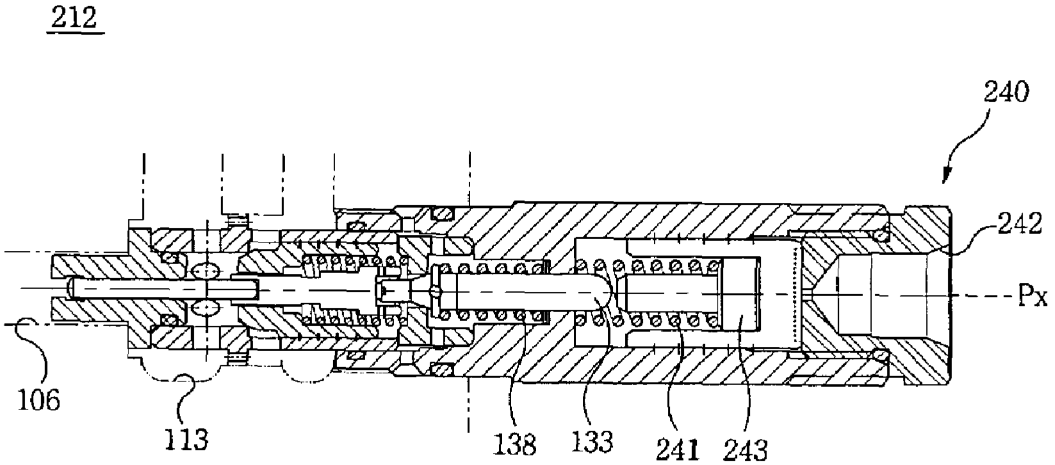
FIG. 7 is a partial cross-sectional view of a regeneration valve for a hydraulic control valve according to another embodiment of the present invention.

FIG. 7 is a partial cross-sectional view of a regeneration valve for a hydraulic control valve according to another embodiment of the present invention.

In this embodiment, the regeneration valve 212 of a hydraulic control valve is operated additionally by a signal pressure Px inputted from outside. When a signal pressure Px is inputted from outside through a signal-inlet 242, a pressure piston 243 whose rear side is supported by a third spring 241 pressurizes the rear end of the pilot poppet 133, whereby the piston 243 together with a second spring 138 changes a predetermined pressure set for the pilot poppet 133.

According to another embodiment of the present invention, when the pressure of a first regeneration fluid passage 113 increased at a result of the applied signal pressure Px, the pressure of a supply fluid passage 106 also increases. In this manner, the combined operation with another working equipment of a large load can be achieved. FIG. 6(*b*) briefly illustrates the relation between the pressure of the supply fluid passage 106 and the pressure of the first regeneration fluid passage 113.

Figure 8:
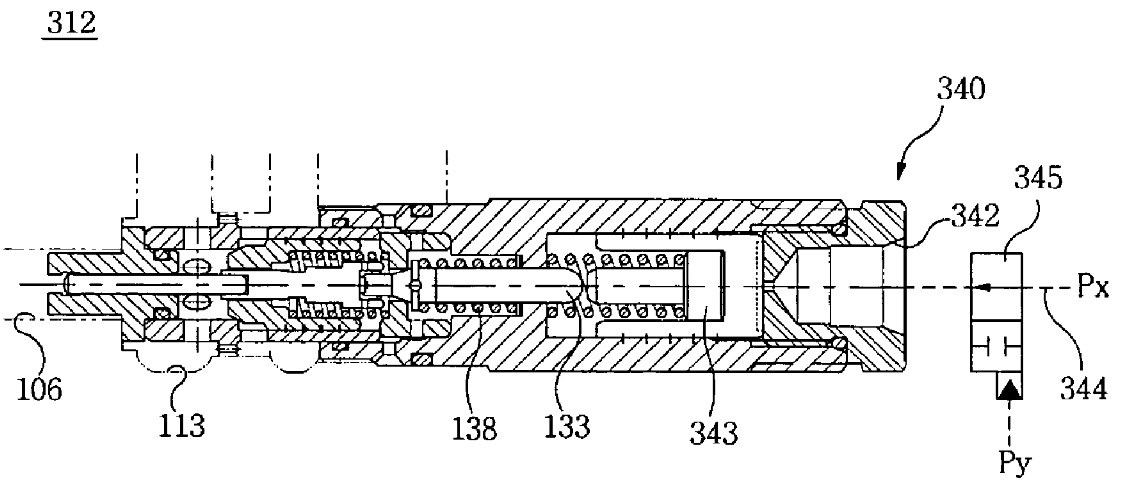
FIG. 8 is a partial cross-sectional view of a regeneration valve in a hydraulic control valve according to yet another embodiment of the present invention.

FIG. 8 is a partial cross-sectional view of a regeneration valve in a hydraulic control valve according to yet another embodiment of the present invention.

Similar to the embodiment shown in FIG. 7, the regeneration valve 312, and a cut-off valve 345 connected to the signal-inlet 342 is installed on a signal passage 344 for supplying an external signal pressure Px.

If a signal pressure Py is inputted to the cut-off valve 345, the cut-off valve 345 switches, say, upward as shown in FIG. 8, to cut off the input of the signal pressure Px to the signal-inlet 342. Meanwhile, if the signal pressure Py is not inputted to the cut-off valve 345, the cut-off valve 345 switches, say, downward as shown in FIG. 8, and allows the signal pressure Px to be inputted to the signal-inlet 342. In result, the front end portion of a pressure piston 343 together with a second spring 138 pressurize the rear end portion of a pilot poppet 133, and change a predetermined pressure set for the pilot poppet 133.

According to yet another embodiment of the present invention, if a large load is applied to the work all the time, the signal pressure Px can always be applied to the signal-inlet 342 anytime to increase the pressure of the supply fluid passage 106. And, when another work equipment requesting a large load is used, the signal pressure Px is cut off and one makes sure that the signal pressure Px is not inputted to the signal-inlet 342. In this manner, the pressure of the supply fluid passage 106 will not be high.

As described above, the hydraulic control valve with the regeneration function according to the present invention is capable of maintaining the pressure in a regeneration fluid passage, irrespective of changes in the discharge flow rate of a hydraulic pump, the location of working equipment, the regeneration flow rate and the return flow rate, so that hunting of the actuator rarely occurs.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and broad scope of the appended claims.

What is claimed is:

1. A hydraulic control valve with a regeneration function, comprising:

a main body formed of a supply fluid passage to which pressurized fluid from outside is supplied, at least one port for supplying the pressurized fluid in the supply fluid passage to an actuator or receiving the return fluid from the actuator, a tank fluid passage for discharging the return fluid from the actuator to an outside storage tank, and a first regeneration fluid passage for supplying part of the return fluid from the actuator to the supply fluid passage;

a spool movably installed inside the main body for controlling the flow of pressurized fluid by opening/closing the connections of the supply fluid passage, the port(s), the tank fluid passage, and the first regeneration fluid passage, respectively, and comprising a second generation fluid passage that supplies the pressurized fluid of the first regeneration fluid passage to the supply fluid passage; and a regeneration valve installed between the first regeneration fluid passage and the tank fluid passage for returning only part of the pressurized fluid of the first regeneration fluid passage to the tank fluid passage to maintain pressure of the first regeneration fluid passage at a designated value, and for supplying the pressurized fluid to the second regeneration fluid passage; and if the pressure of the supply fluid passage is higher than a predetermined pressure, changing the pressure of the first regeneration fluid passage in accordance with a change of the pressure of the supply fluid passage, wherein the regeneration valve is comprised of:

a sleeve installed between the first regeneration fluid passage and the tank fluid passage, and formed of a first fluid passage communicating with the first regeneration fluid passage and a second fluid passage communicating with the tank fluid passage;

a main poppet movably installed inside the sleeve by being elastically supported by a first spring for changing an opening area of the second fluid passage, and comprising a back pressure chamber formed therein;

a pilot poppet movably installed inside the sleeve by being elastically supported by a second spring, and if pressure of the back pressure chamber exceeds a predetermined pressure, discharging pressurized fluid of the back pressure chamber to the tank fluid passage;

a pilot piston movably installed on a piston passage formed in front of the main poppet to be in contact with the front end portion of the pilot poppet; and a piston slidably installed on the front side of the sleeve for the rear end of the piston to be in contact with the front end portion of the pilot piston, and if the pressure of the supply fluid passage applied to the front end portion of the pilot piston exceeds the predetermined pressure set for the pilot poppet, moving the pilot piston and the pilot poppet backward.

2. The hydraulic control valve according to claim 1, further comprising:

a pressure regulator installed on the rear end of the regeneration valve for assisting the second spring to change the predetermined pressure set for the pilot poppet.

3. The hydraulic control valve according to claim 2, wherein the pressure regulator is operated by a signal pressure inputted from outside.

* * * * *